(No Model.) 2 Sheets—Sheet 1.

H. A. WOLFF.
DRY VACUUM COOKER.

No. 603,546. Patented May 3, 1898.

WITNESSES:
Edward Thorpe
J. Fred Acker

INVENTOR
H. A. Wolff
BY
Munn
ATTORNEYS.

(No Model.) 2 Sheets—Sheet 2.
H. A. WOLFF.
DRY VACUUM COOKER.
No. 603,546. Patented May 3, 1898.
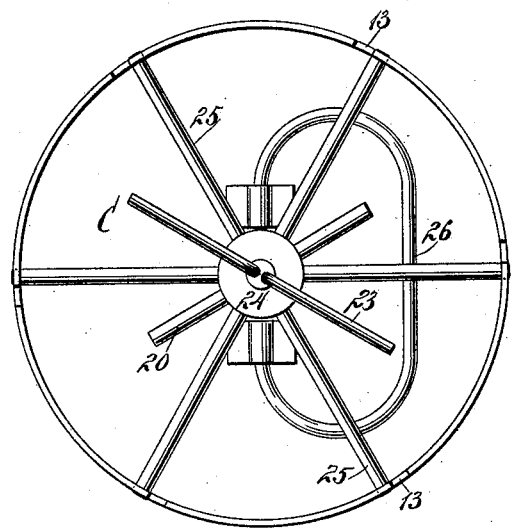
Fig. 3.
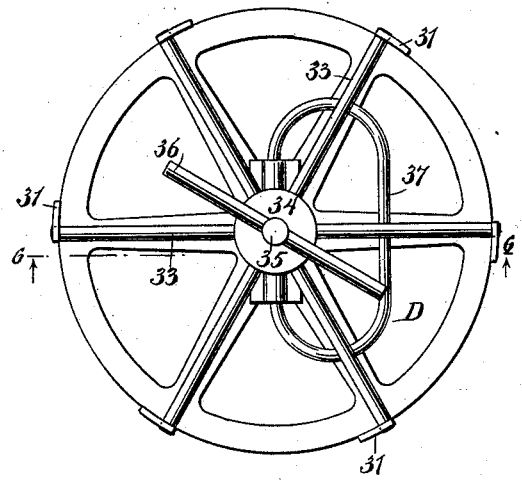
Fig. 5.
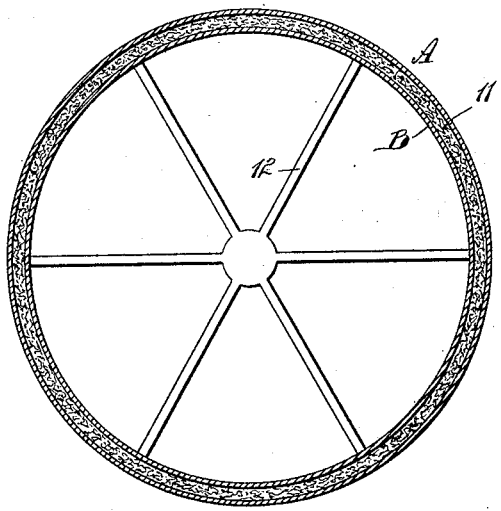
Fig. 4.
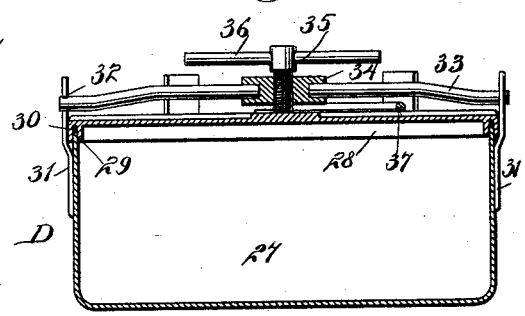
Fig. 6.
WITNESSES:
Edward Thorpe
J. Fred Acker
INVENTOR
H. A. Wolff.
BY 
ATTORNEYS.

UNITED STATES PATENT OFFICE.

HERRMANN A. WOLFF, OF NEW HAVEN, CONNECTICUT.

DRY VACUUM-COOKER.

SPECIFICATION forming part of Letters Patent No. 603,546, dated May 3, 1898.

Application filed June 15, 1897. Serial No. 640,807. (No model.)

*To all whom it may concern:*

Be it known that I, HERRMANN A. WOLFF, of New Haven, in the county of New Haven and State of Connecticut, have invented a new and Improved Dry Vacuum-Cooker, of which the following is a full, clear, and exact description.

The object of my invention is to provide an improvement in cooking apparatus in which the articles will be cooked dry—that is, they will be cooked without water and in their own juices.

Another object of the invention is to construct a cooker of this description which will be exceedingly simple, durable, and economic and in which a number of vegetables, for example, may be cooked at one time without the slightest danger that the odors from one vegetable will penetrate to a vessel in which another vegetable may be placed, and wherein the material to be cooked will lie quietly in the vessel in which it is placed and will not be ground up or become mushy, and wherein the contents of all the vessels will retain all the chemical qualities belonging to such articles.

Another object of the invention is to so construct the device that during the progress of cooking the contents of the various vessels will not become burned, dried up, or in any way stale and can be kept hot for any length of time desired.

A further object of the invention is to provide a cooking apparatus which can be used upon any form of stove and placed over any character of flame or fuel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
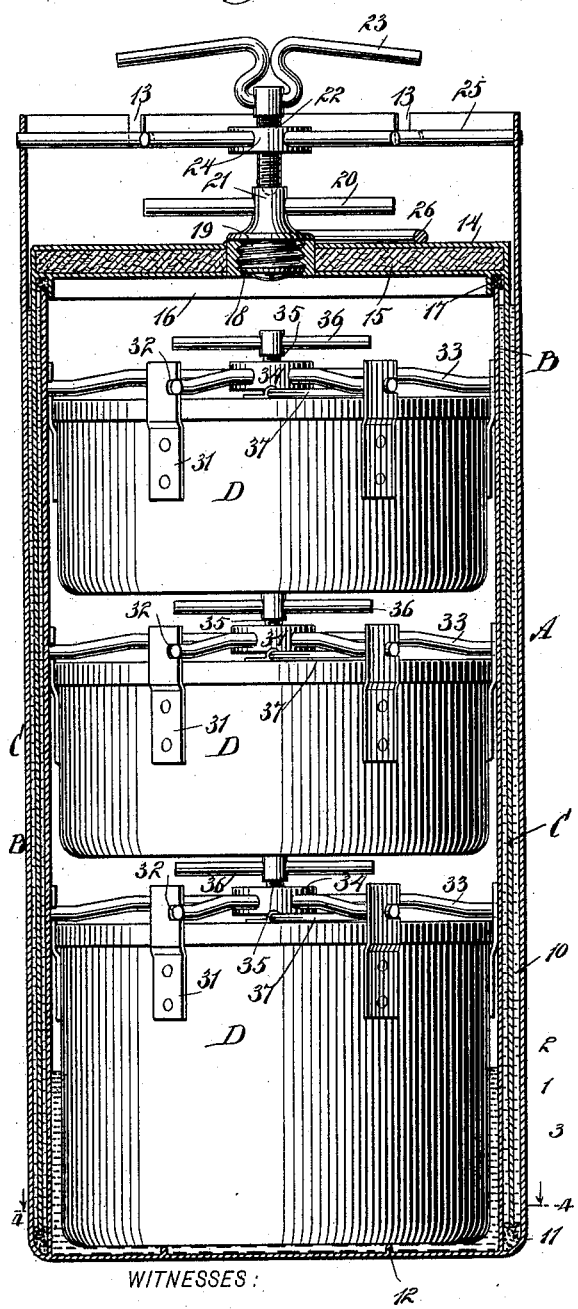
Figure 2:
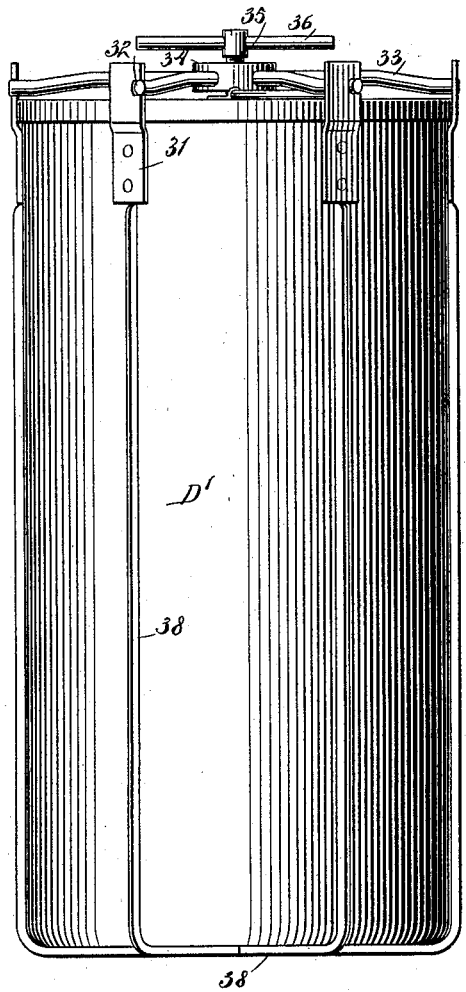

Figure 1 is a vertical section through the body portion of the cooking apparatus, the receptacles containing the material to be cooked being shown in side elevation. Fig. 2 is a side elevation of a single receptacle adapted to be placed in the body of the apparatus. Fig. 3 is a plan view of the apparatus. Fig. 4 is a horizontal section on the line 4 4 of Fig. 1. Fig. 5 is a plan view of one of the receptacles or vessels in which the material to be cooked is placed; and Fig. 6 is a vertical section through the said receptacle or vessel, the section being taken on the line 6 6 of Fig. 5.

The body of the apparatus consists of a cylinder A, which is preferably made of metal and of such strength as in practice may be found desirable. The cylinder A is provided with an inner cylinder B of lesser length, the inner cylinder being securely fastened to the outer or main cylinder A at the bottom. A space 10 is therefore obtained between the body-cylinder and its inner cylinder, as shown in Fig. 1. This space is adapted to receive water, and in operation the column of water will extend substantially to the top portion of the said inner cylinder. A packing 11 is located in the bottom of the space 10 for a purpose to be hereinafter described.

In connection with the main cylinder A, having the double and spaced walls above described, an inner cylinder C is employed. This inner cylinder is open at its lower end and is provided at its upper end with a cover 14. This cover is preferably made double, as shown, and between its walls a packing 15 of asbestos is located or a packing of other non-heat-conducting material. The cover or top 14 of the inner cylinder C is provided with a flange 16, and between this flange, which is downwardly inclined, and the outer wall of the inner or removable cylinder a space is provided adapted to receive the upper edge of the inner convexed cylindrical portion of the body of the apparatus, and when the movable cylinder is in proper position it will extend down into the space 10 until it engages with the bottom packing 11 in such manner as to provide a space between the outer cylinder A and the side wall of the movable cylinder and the side wall of the movable cylinder and the inner cylinder B, which forms a portion of the body, thus dividing the water which is contained in the space 10 into two separate columns, and the upper end of the inner fixed cylinder B will engage with the packing 17 at the top of the movable cylinder, thus providing a thorough water seal and effectually preventing the heat which may be supplied to or contained in the movable cylinder from passing to any great extent out therefrom, since the heat so escaping must force its way past the second packing 15, down the inner column of water, past the lower packing 11, and out through the outer column of water. This double column of water will materially lessen the escape of heat by radiation.

The cover 14 for the movable or inner cylinder C is provided with a threaded opening, preferably at its center, into which a correspondingly-threaded plug 18 is entered, provided with an upwardly-extending shank 19 and a handle 20, the latter being located above the said cover 14, as shown in Fig. 1. This plug is for the purpose of permitting the escape of air from within the movable cylinder as the said cylinder is carried down to its place in the body-cylinder, and the said plug is also turned in a manner to permit the entrance of air when the movable cylinder is to be withdrawn from the main cylinder. The plug 18 is virtually a valve and may be so considered. For convenience hereinafter in referring to the construction of the main or body cylinder A the inner convexed cylinder B will be denominated an "inner jacket."

When the movable cylinder C is in position in the main cylinder—that is, between its outer wall and the jacket B—it may be held in place in many ways. Preferably, however, it is secured as shown in the drawings, in which bayonet or L-shaped slots or recesses 13 are made in the upper edge of the main or body cylinder A, and a screw 22 is made to enter a socket 21 in the shank or stem of the valve 18. This screw is provided at its top with a handle 23, of suitable formation, and carries below the handle a nut 24. From this nut a series of arms 25 are radially projected, being adapted to enter one in each of the slots 13. After the arms have passed into the vertical portions of these slots they are turned and made to enter the horizontal portions, whereupon the screw 22 is manipulated to raise the nut 24, and thereby securely hold the movable cylinder in the desired position.

Any desired number of vessels D adapted to contain the material to be cooked may be placed within the jacket B of the main cylinder. When a number of vessels D are employed, they are preferably placed one upon the other, as shown in Fig. 1, although any suitable provision may be made for holding them in predetermined relation to each other. In the drawings each of the receptacles D comprises a body 27, usually made from one piece, although it may be otherwise constructed, and a cover 28, which is provided with a downwardly-extending double flange 29, and a packing 30 is placed between these flanges for engagement with the top of the body of the vessel when the cover is in place thereon.

Brackets 31 are secured in suitable numbers to the outer sides of the body of the vessels, and these brackets extend upward beyond the cover, each being provided in a side edge with a recess 32. Arms 33 are adapted to enter the said recesses 32, and these arms are projected from a nut 34, carried by a screw 35, having a suitable handle 36, and when the arms 33 are in the recesses of the brackets 31 by turning the screw 35 in a proper direction the nut 34 is raised and the arms are held firmly in engagement with the brackets, while the screw serves to effectually prevent the central portion of the cover from bulging to any extent.

It may here be remarked that in the bottom portion of the main or body cylinder A I prefer to place ribs 12, which radiate from the center, as shown in Figs. 1 and 4, upon which ribs the bottom of the lowermost receptacle or vessel D may be placed.

In Fig. 2 I have illustrated a vessel or receptacle D′, which is capable of practically filling the space within the jacket B of the main or body cylinder, and when such a large receptacle is employed for cooking purposes I usually reinforce the receptacle by forming exterior ribs 38 thereon, which ribs extend from a point near the top or from the top down to the bottom and preferably along the bottom, converging at the center. The fastening device for the larger form of the receptacle is usually the same as that employed for the smaller type, and in connection with the cover for either of the receptacles or vessels D and D′ a handle 37 is used, whereby the cover may be taken from the body, and a handle 26 is also placed on the upper portion of the removable cylinder to facilitate its manipulation.

In operation a comparatively small quantity of water is placed in the jacket B before the vessels are inserted, and the space 10 between the jacket B and the body of the cylinder is filled with water, as heretofore stated. The vegetables or other articles to be cooked are placed in the vessels or receptacles D without adding any water to them, and these vessels or receptacles are sealed before they are placed in the jacket. The removable cylinder is now made to enter the space 10 and is forced downward until its lower end engages with the lower packing 11, and the upper edge of the jacket B engages with the packing 17 in the top of the said removable cylinder. When the removable cylinder is thus introduced into the body of the apparatus, the single column of water in the space 10 is divided into two independent columns of water, and these columns of water serve as a water seal to prevent as far as possible the escape of heat from within the jacket and from around the vessels containing the articles being cooked. Finally the removable cylinder is locked in place, and the apparatus is placed upon a stove or other heating medium. The heat will be communicated to the closed space within the apparatus around the cooking vessels and will serve to so heat the latter as to cause a gradual, yet perfect, cooking of the contents of each vessel, and any steam that may arise from the water in the bottom of the jacket is prevented from entering the receptacles or vessels by reason of the force of the steam contained in said vessels, due to the evaporation of the fluids incident to the articles being cooked. After it has been determined when the articles have been thoroughly cooked, which is readily done by experience, the locking device is removed from the removable cylinder, which is practically a cover-cylinder, and the valve 18 is opened. This cylinder may now be withdrawn from the body-cylinder, and the cooking vessels or receptacles may be readily taken out. It will be impossible at this time to open the lids of the various receptacles even though the fastening devices provided be removed, because of the fact that a vacuum will have been established in the said receptacles by reason of their cooling off and a corresponding condensation of the steam; but after the fastening devices have been removed from the cover for a short time the air will gradually find its way into the vessels or receptacles, destroying the vacuum, and the covers may then be readily taken off. The contents of the vessels will now be found to have lost none of their weight and will have practically the same plump appearance as when first placed in the vessels.

Having thus described my invention, I claim as new and desire to secure by Letters Patent—

1. In a cooking apparatus, a body or casing having a water-space around the same, a cover-casing open at one end and closed at the opposite end, the said cover-casing being arranged to enter the water-space of the main casing to form a double water-jacket within the body or casing, and a locking device for the cover-casing, substantially as described.

2. In a cooking apparatus, a body or casing having a water-space around the same, a cover-casing open at one end and closed at the opposite end, being provided with a valve in its closed end, the said cover-casing being also adapted to enter the water-space of the main casing to form a double water-jacket therefor, a packing located in the bottom of the water-space, with which the open end of the main casing engages, a packing carried by the closed end of said cover-casing, arranged for engagement with the upper edge of the inner wall of the main casing, and a locking device for the cover-casing, for the purpose specified.

3. In a cooking apparatus, the combination, with a casing provided with a surrounding water-space having a packing at its bottom, and a cover-casing open at one end and closed at the other, the closed end being provided with a valve and with packing, the packing at the closed end of the casing being arranged for engagement with the upper portion of the inner wall of said water-space, the sides of the cover-casing being arranged to extend within the water-space to form a double water-jacket and its open end to engage with the packing in the said space, of a locking device for the cover-casing, and vessels adapted to receive the articles to be cooked, located within the body-casing beneath the closed portion of the cover-casing, and locking devices for the covers of said vessels, as and for the purpose specified.

4. A cooking utensil, comprising an outer casing having an open upper end, and an interior spaced annular wall secured at its lower end to the bottom of the casing and its upper end terminating near the open end of the casing, and a cover-casing fitted telescopically between the inner wall of the outer casing and the spaced annular wall, whereby a double water-jacket is provided for the cooking-chamber, substantially as described.

HERRMANN A. WOLFF.

Witnesses:
J. FRED. ACKER,
JNO. M. RITTER.